United States Patent [19]
Knutson

[11] Patent Number: 5,118,749
[45] Date of Patent: Jun. 2, 1992

[54] EMULSION POLYMERS AND PAINT FORMULATED THEREWITH

[75] Inventor: Gaylen M. Knutson, Yorba Linda, Calif.

[73] Assignee: Union Oil Company of California, Los Angeles, Calif.

[21] Appl. No.: 401,096

[22] Filed: Aug. 31, 1989

[51] Int. Cl.$^5$ .............................................. C08L 31/02
[52] U.S. Cl. .................................. 524/460; 524/558; 524/560; 524/457
[58] Field of Search ................ 524/460, 558, 560, 457

[56] References Cited

U.S. PATENT DOCUMENTS

| | | | |
|---|---|---|---|
| 2,976,203 | 3/1961 | Young et al. | 524/15 |
| 3,248,356 | 8/1966 | Snyder | 523/221 |
| 3,513,120 | 5/1970 | Pohlemann et al. | 524/460 |
| 3,562,235 | 2/1971 | Ryan | 428/220 |
| 3,804,881 | 8/1974 | Bassett et al. | 526/80 |
| 3,876,596 | 8/1975 | Grubert et al. | 524/44 |
| 4,030,500 | 8/1977 | Bassett et al. | 604/328 |
| 4,265,796 | 5/1981 | Mueller-Mall et al. | 524/733 |
| 4,492,780 | 1/1985 | Zimmerschied et al. | 524/45 |

Primary Examiner—Joseph L. Schofer
Assistant Examiner—Jeffrey T. Smith
Attorney, Agent, or Firm—Gregory F. Wirzbicki; William M. Dooley

[57] ABSTRACT

ICI viscosity of a paint is improved by incorporating into the paint an acrylic polymer emulsion or latex made with the use of a water soluble chain transfer agent, preferably one that comprises both sulfur functionality and hydroxyl functionality. A preferred chain transfer agent is monothioglycerol.

41 Claims, No Drawings

EMULSION POLYMERS AND PAINT FORMULATED THEREWITH

BACKGROUND

The present invention relates to latex paints, to polymeric emulsions or latexes useful as binders for latex paints, and to processes for making such emulsions.

Latex paints are mixtures of many ingredients. Typical ingredients include coalescing aids, thickening aids, dispersing aids, defoamers, biocides, pigments, and binders. The large number of ingredients makes it difficult to formulate latex paints. In addition, optional ingredients are also employed in latex paints to enhance various paint properties. For example, rheology modifiers are often employed to enhance the flow and leveling and film build characteristics of a paint.

Flow and leveling is an indication of a paint's ability to form a smooth surface devoid of brush marks, roller marks, or other film thickness irregularities upon application of the paint to a surface. Film build relates to the thickness of a paint film that can be applied in one coat. It is an indication of a paint's hiding power, that is, an indication of how well one coat of the paint conceals a surface.

The viscosity of a pigmented paint usually decreases with increased shear rate, an effect called shear thinning. The relationship is non-linear and is difficult to predict with precision because it is affected by the many different ingredients and processing techniques employed in formulating paints. During application of a paint, for example by brushing, rolling, or spraying, flow is vigorous and shear rates are correspondingly high, on the order of 1000 to 10000 sec$^{-1}$ or more. As a result of shear thinning, the viscosity of the paint is low, on the order of 0.1 to 10 poise. Once the paint has been applied, continued flow within the film from leveling, sag, or slump is slow and shear rates are correspondingly low, on the order of 0.001 to 1 sec$^1$. At such low shear rates, the viscosity of the paint can be as high as 100 to 1000 poises or more.

The paint properties of film build and flow and leveling are not mutually opposed, but it is difficult to achieve both to a desirable degree in a single paint formulation. For acceptable film build, shear thinning must be limited, so that the paint has sufficiently high viscosity, under the high shear rate conditions that prevail in the wet paint film at the point of application, to form a desirably thick film on the substrate. For example, a paint must have a high enough viscosity under brushing conditions that a paint film of the desired thickness will adhere to the surface as the brush moves past. However, for acceptable flow and leveling, it is necessary to avoid excessively high viscosity in the wet paint film under the low shear rate conditions that prevail immediately after the paint is applied. Otherwise, brush marks and other irregularities will remain to mar the appearance of the dried paint film. After a paint has been applied to a surface, the wet film must have a low enough viscosity that the forces attributable to surface tension can cause the paint to flow from thicker to thinner regions of the film to achieve the desired leveling, or uniform film thickness. At the same time, the viscosity must not be so low that the film will sag, slump, or drain excessively on vertical or slanted surfaces under the force of gravity.

Flow and leveling is a property of the paint and is determined by complex interactions among the various ingredients. The low shear viscosity of the polymer emulsion used in the paint is a contributing factor in flow and leveling and also affects other characteristics of the paint, such as its behavior during formulation, flow through pipes, brush loading, and the like. In general, it is desirable to keep the viscosity of the emulsion itself fairly low to allow for flexibility in the formulation of paints having the desired flow characteristics. For example, if the emulsion viscosity is too high, it may be harder to formulate a paint having acceptable flow and leveling.

Emulsion polymerization is a widely used process for making polymer emulsions or latexes. The polymer emulsion is made, for example, by charging the monomeric ingredients, water, and a surfactant into a reaction vessel, emulsifying the monomers, purging the reaction vessel with an inert gas to remove oxygen, and heating the reaction vessel to the reaction temperature. An initiator is then added to the reaction vessel, and the reaction is continued for about 2 to about 4 hours. After the reaction is completed, the reaction vessel is cooled. This synthesis yields an aqueous polymeric composition comprising polymer particles suspended or dispersed in water.

Chain transfer agents can be added to the reaction vessel to lower the molecular weight of the resulting polymer. For latexes that are used as conventional surface coatings, it is usually desirable to maximize molecular weight, and so chain transfer agents are not used. However, when it is desirable to produce a polymer emulsion having lower viscosity, or where shorter chain length is desired for other reasons, minor proportions of chain transfer agents can be used.

SUMMARY OF THE INVENTION

The present invention provides an acrylic latex paint which is capable of exhibiting enhanced film build without the use of a rheology modifier. The latex paint comprises an acrylic polymer latex specially made in accordance with this invention to improve the film build of the paint.

The latex, comprising water and a substantially water-insoluble acrylic polymer, is formed by reacting at least one monomer, usually a plurality of monomers. At least a portion of the polymerization is conducted in the presence of a chain transfer agent. Surprisingly, the use of a chain transfer agent in accordance with this invention produces an acrylic polymer latex that improves the film build of a paint comprising the latex, regardless of the effect that the chain transfer agent has on the viscosity of the latex itself.

Preferably, the chain transfer agent and a portion of the monomer are delay added to the reaction vessel. The term "delay added" is a term of art that means ingredients are added after at least a portion of the polymerization reaction has occurred. The chain transfer agent is desirably at least slightly soluble in water. The chain transfer agent is preferably an alkyl mercaptan. More preferably, the chain transfer is an alkyl mercaptan having hydroxyl functionality, such as monothioglycerol.

The invention also encompasses a composition formed by drying the latex paint as well as an article having at least a portion of its surface coated with the composition.

The present invention is thus directed to (a) a polymer emulsion or latex comprising water and a substantially water insoluble acrylic polymer, (b) a process for making the latex, (c) a paint containing the latex, (d) a composition formed by drying the paint, and (e) an article having a portion of its surface coated with the dried paint.

DETAILED DESCRIPTION OF THE INVENTION

In accordance with this invention, an acrylic polymer emulsion is prepared in an emulsion polymerization process. A monomer feed comprising at least one acrylate monomer, usually a mixture of acrylate monomers, is emulsified in water, usually with a surfactant, and is polymerized in a reaction zone in the presence of a polymerization catalyst and a chain transfer agent. The monomer feed comprises more than about 50 phm, preferably at least about 75 phm, even more preferably at least about 90 phm, of an acrylate monomer or mixture of acrylate monomers. The abbreviation "phm" means parts per hundred parts, by weight, of the total polymerizable monomer used in preparation of the polymer emulsion.

The acrylate monomers can be represented by the formula I

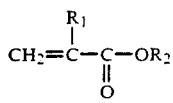

(I)

wherein $R_1$ is selected from the group consisting of hydrogen, alkyl and halo-substituted alkyl groups having 1 to about 6 carbon atoms, and halogen, notably chlorine, with hydrogen and unsubstituted alkyl groups preferred; and $R_2$ is a monovalent organic radical containing up to about 18 carbon atoms. $R_2$ can be a substituted or unsubstituted alkyl, cycloalkyl, alkylaryl, or arylalkyl group, the alkyl groups typically having from 1 to about 12 carbon atoms, the cycloalkyl groups having from 5 to 8 carbon atoms in the ring, and the arylalkyl and alkylaryl groups typically having from 6 to about 18 carbon atoms. The organic radicals may bear substituents such as halogen, amino, alkoxy, and hydroxyl groups. Alkyl esters of acrylic acid and methacrylic acid having 1 to about 8 carbon atoms in the alkyl group are preferred.

Examples of suitable acrylate monomers include, but are not limited to, methyl acrylate, methyl methacrylate, 2-phenoxyethyl acrylate, norbornenyl acrylate, dicyclopentenyl acrylate, cyclohexyl acrylate, 2-tolyloxyethyl acrylate, isopropyl methacrylate, ethyl acrylate, methyl alphachloroacrylate, beta-dimethylaminoethyl methacrylate, ethyl methacrylate, 2-ethylhexyl acrylate, 2-ethylhexyl methacrylate, cyclohexyl methacrylate, hexyl methacrylate, 2-methylcyclohexyl methacrylate, beta-bromoethyl methacrylate, benzyl methacrylate, phenyl methacrylate, neopentyl methacrylate, butyl methacrylate, hexyl acrylate, dodecyl acrylate, 3-methyl-1-butyl acrylate, -ethoxyethyl acrylate, phenyl acrylate, butoxyethoxyethyl acrylate, 2-methoxyethyl acrylate, octyl acrylate, isodecyl acrylate, dichloroisopropyl acrylate, butyl chloroacrylate, lauryl chloroacrylate, and the like. Preferred are lower alkyl acrylates and methacrylates in which the alkyl group has from 1 to about 8 carbon atoms, more preferably from 1 to about 4 carbon atoms, such as methyl acrylate, methyl methacrylate, ethyl acrylate, n-propyl acrylate, isopropyl methacrylate, n-butyl methacrylate, and t-butyl acrylate. The acrylate monomers are usually employed in amounts of more than about 50 phm, preferably at least about 75 phm, more preferably at least about 90 phm, and even at least about 95 phm. Combinations of acrylate monomers are usually used to achieve desired properties. For exterior paint, a combination of butyl acrylate and methyl methacrylate in amounts of from about 50 to about 60 phm and from about 35 to about 45 phm, respectively, is highly preferred.

Preferably, the monomer feed includes at least one acrylate monomer wherein $R_2$ is a hydroxyalky group having up to about 8 carbon atoms, such as 2-hydroxyethyl acrylate, 2-hydroxyethyl methacrylate, 2-hydroxypropyl acrylate, 3-hydroxypropyl acrylate, 1-hydroxypropyl methacrylate, 2-hydroxypropyl methacrylate, 3-hydroxpropyl methacrylate, 1-hydroxybutyl acrylate, and 2-hydroxyhexyl methacrylate. Hydroxypropyl methacrylates are preferred. The hydroxyalkyl monomers are generally used in proportions of from about 0.1 to about 10 phm, preferably from about 0.5 to about 5 phm, and more preferably from about 1 to about 3 phm.

Preferably, the monomer feed also includes at least one ethylenically unsaturated carboxylic acid monomer that is copolymerizable with the acrylate monomers in the feed. Examples of these are acrylic acid; methacrylic acid; alpha-haloacrylic acids such as chloroacrylic acid; itaconic acid; maleic acid; and fumaric acid. Acrylic acid is preferred for increasing the high shear viscosity of a paint made with the resulting polymer emulsion. Methacrylic acid is more preferred because it improves the high shear viscosity of paint without unduly increasing the low shear viscosity of the polymer emulsion itself. The acid monomers are usually included in amounts of from about 0.1 to about 10 phm, more preferably from about 0.5 to 5 phm, and most preferably from about 2 to about 5 phm.

It is also advantageous to include in the monomer feed at least one wet adhesion promoter such as a ureido-containing monomer, a cyanoacetoxy-containing monomer, an acetoacetoxy-containing monomer, hydroxymethyl diacetone acrylamide, and mixtures thereof. The wet adhesion promoter is usually employed in proportions of from about 0.1 to about 5 phm, preferably from about 0.5 to about 2 phm.

The ureido-containing monomers contain a ureido group of the formula V:

(V)

Exemplary ureido-containing monomers include, but are not limited to, 2-ureido-ethyl acrylate, 2-ureido-ethyl methacrylate, 2-ureido-ethyl acrylamide, 2-ureido-ethyl methacrylamide, 1-[2-(3-allyloxy-2-hydroxypropylamino)ethyl]-imidazolidin-2-one. Mixtures of ureido-containing monomers can be used. A commercially available ureido-containing monomer is 1-[2-(3-allyloxy-2-hydroxy-propylamino)ethyl]-imidazolidin-2-one which is commercially known as Sipomer WAM brand monomer available from Alcolac.

Cyanoacetoxy-containing monomers and acetoacetoxy-containing monomers have the formulas VI and VII. respectively.

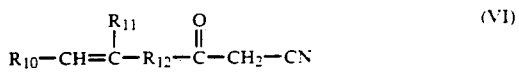

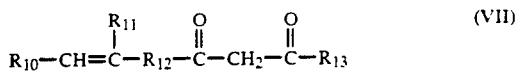

wherein $R_{10}$ is selected from the group consisting of hydrogen and halogen, $R_{11}$ is selected from the group consisting of hydrogen, halo, thio, and monovalent organic radicals, $R_{12}$ is a divalent radical, and $R_{13}$ is selected from the group consisting of hydrogen and monovalent organic radicals. As used throughout the specification and claims, the term "organic radical" means any group containing at least one carbon atom, and the term "inorganic radical" means any group devoid of carbon atoms.

Preferably, $R_{10}$ is hydrogen, $R_{11}$ is hydrogen or an alkyl radical having up to about 10 carbon atoms, $R_{12}$ is a cyclic or acyclic organic radical containing up to about 40 carbon atoms, and $R_{13}$ is an acyclic organic radical containing up to about 15 carbon atoms. More preferably, $R_{12}$ is an acyclic radical containing up to about 20 atoms in length, with any and all side groups each being up to about 6 atoms in length, and $R_{13}$ is hydrogen or an alkyl group containing up to about 7 carbon atoms. $R_{12}$ is most preferably alkylene and alkoxylene groups containing up to about 10 carbon atoms, and $R_{13}$ is most preferably methyl. While acetoacetoxyethyl methacrylate, cyanoacetoxyethyl methacrylate, and allylacetoacetate are reported in the literature, and while acetoacetoxyethyl methacrylate and allylacetoacetate are commercially available, acetoacetoxyethyl methacrylate is the preferred acetoxy-containing monomer.

In the most preferred embodiment of this invention, a combination of polymerizable monomers is used, which comprises at least three different acrylate monomers, at least one of which is a hydroxyalkyl acrylate monomer, at least one ethylenically unsaturated carboxylic acid monomer, and at least one ureido-containing wet adhesion promoter. The two acrylate monomers together are present in a proportion of from about 90 to about 97 phm; most preferred are butyl acrylate and methyl methacrylate in proportions of from about 50 to about 60 phm and from about 35 to about 45 phm respectively. The hydroxyalkyl acrylate is used in amounts of from about 1 to about 4 phm; most preferred is hydroxypropyl methacrylate in a proportion of about 1.5 to about 3 phm. The acid monomer is used in proportions of from about 1 to about 5 phm; most preferred is methacrylic acid in a proportion of about 2 to about 4 phm. The ureido-containing wet adhesion promoter is used in proportions of from about 0.5 to about 2 phm; most preferred is 1-[2-(3-allyloxy-2-hydroxy-propylamino)ethyl]-imidazolidin-2-one in a proportion of about 0.7 to 0.9 phm.

Optional ethylenically unsaturated polymerizable monomers can also be present in the monomer feed. These include, but are not limited to, ethylene; vinyl monomers; acrylamides; alkenyl aromatics; alkadienes; and mixtures thereof. These optional monomers are used in proportions of less than about 50 phm, usually less than about 20 phm, and preferably less than about 10 phm.

Typical vinyl monomers include, but are not limited to, vinyl halides, vinylidene halides, acrylonitrile, and vinyl esters such as vinyl acetate, vinyl propionate, vinyl butyrate, vinyl valerate, vinyl benzoate, and vinyl versatate.

The acrylamide monomers generally have the formula

wherein $R_3$ is selected from the group consisting of hydrogen, alkyl groups containing 1 to about 6 carbon atoms, and halo-substituted alkyl groups containing 1 to about 6 carbon atoms, and $R_4$ and $R_5$ are each an alkyl group independently containing up to about 18 carbon atoms. Preferably, $R_3$ is selected from the group containing hydrogen and methyl, and $R_4$ and $R_5$ are each an alkyl group independently containing up to about 8 carbon atoms.

As used in the specification and claims, "alkenyl aromatic monomers" are defined as any organic compound containing at least one aromatic ring and at least one aliphatic-containing moiety having alkenyl unsaturation. Preferred alkenyl aromatic monomers are represented by the formula III

wherein X is an aliphatic radical containing at least one alkenyl bond, Y is a substituent on the aromatic ring, and n is the number of Y substituents on the ring, n being an integer from 0 to 5. Generally, X comprises at least 2 carbon atoms, but usually no more than about 6, and preferably no more than about 3 carbon atoms. X is preferably a substituted or unsubstituted alkenyl group. Preferred alkenyl group substituents are halogen radicals, e.g., chloride. However, the most preferred alkenyl group is unsubstituted, i.e., a hydrocarbon, and contains only one olefinic unsaturation. Ethylene is the most preferred X.

Y is an organic or inorganic radical. When n is 2 or more, Y can be the same or different. If organic, Y generally contains from 1 to about 15 carbon atoms and, preferably, is an aliphatic radical. Even more preferably, Y is a saturated aliphatic radical. If inorganic, Y is preferably a halogen. Exemplary Y substituents include halo and cyano radicals and substituted and unsubstituted alkyl radicals of 1 to about 10 carbon atoms. Preferred Y substituents are chloride and unsubstituted alkyl groups of 1 to about 6 carbon atoms. Y is more preferably a chloride radical and $C_1$ to about $C_4$ unsubstituted alkyl radicals.

Illustrative alkenyl aromatic monomers include styrene, p-methyl styrene, methyl styrene, o,p-dimethyl styrene, o,p-diethyl styrene, p-chlorostyrene, isopropyl styrene, t-butyl styrene, o-methyl-p-isopropyl styrene, o,p-dichlorostyrene, and mixture thereof. Due to its commercial availability and low cost, styrene is the preferred alkenyl aromatic monomer.

Exemplary alkadiene monomers have the formula IV

wherein $R_6$, $R_7$, $R_8$, and $R_9$ are each independently selected from the group consisting of hydrogen, halogen, and alkyl radicals containing 1 to about 2 carbon atoms. Commercially available alkadiene monomers include butadiene, isoprene, 1,3-pentadiene, 2-ethyl butadiene, and 4-methyl-1,3-pentadiene. The preferred alkadiene monomer is butadiene.

Chain transfer agents useful in the practice of this invention are at least slightly soluble in the aqueous polymerization medium under polymerization conditions. The phrase "at least slightly soluble" as used in the specification and the claims means more soluble than n-dodecyl mercaptan. The chain transfer agent is preferably at least 50 percent more soluble, more preferably at least 100 percent more soluble, than n-dodecyl mercaptan in the polymerization medium under polymerization conditions, e.g., temperature, pH, and the like. The chain transfer agents can usually be selected from aliphatic mercaptans having from 1 to about 4 carbon atoms; aliphatic halides, preferably chlorides, having 1 to about 3 carbon atoms; aliphatic alcohols having 1 hydroxyl group and from 1 to about 6 carbon atoms; and aliphatic alcohols having 2 or more hydroxyl groups and 2 to about 10 carbon atoms or more. Specific examples of these include, but are not limited to, methyl mercaptan, ethyl mercaptan, n-propyl mercaptan, isopropyl mercaptan, n-butyl mercaptan, sec-butyl mercaptan, t-butyl mercaptan, and butyl-1,4-dimercaptan; carbon tetrachloride, chloroform, trichlorobromomethane, chloroethane, fluoroethane, chlorofluoroethane, and trichloroethylene; methanol, ethanol, ethylene glycol, 1-propanol, 1,3-propanediol, glycerol, vinylglycol, 1,4-butanediol, but-1-en-3-ol, 1-pentanol, 2-pentanol, t-amyl alcohol, 1,2,3-hexanetriol, 1,2,5-hexanetriol, and 1,10-decanediol. Also useful are aliphatic mercaptans having carboxylic acid functionality, such as thioglycolic acid (mercaptoacetic acid), thiodiglycolic acid, and thiomalic acid (mercaptosuccinic acid); and aliphatic sulfides, such as diallyl sulfide, diethenyl sulfide, and diethyl sulfide.

Preferred chain transfer agents have both sulfur functionality active for chain transfer and oxygen functionality capable of participating in hydrogen-bonding interactions. These can be represented by the formula VIII $$R_{14}\text{—S—}R_{15} \qquad (VIII)$$

wherein $R_{14}$ and $R_{15}$ are independently selected from (a) straight-chain or branched aliphatic radicals having at least 1 hydroxyl group, preferably 2 or more hydroxyl groups, and from 2 to about 6, preferably 2 to about 4 carbon atoms, and (b) aliphatic radicals having at least 1 hydroxyl group, at least 2 carbon atoms, and at least 1 ether oxygen. $R_{15}$ can also be, and preferably is, hydrogen. Specific examples of $R_{14}$ and $R_{15}$ include, but are not limited to, 1-hydroxyethyl, 1-hydroxypropyl, 1,2-dihydroxypropyl, 2-hydroxybutyl, 1,3-dihydroxypentyl, 1,2,3-trihydroxyhexyl, 1,2,5-trihydroxyhexyl, $HOCH_2CH_2OCH_2$—, and $HOCH_2CH_2OCH_2CH_2$—. $R_{14}$ and $R_{15}$ can be even larger carbon chain radicals having many hydroxyl groups; hydroxy-terminated polyether radicals derived from polyethylene glycols, polypropylene glycols, polyethylene oxides, polypropylene oxides, and the like; and polyhydric polyether radicals derived from, for example, polyglycerols. Highly preferred for their high chain transfer activity, low cost, commercial availability, and high sulfur to hydroxyl ratio are monothioglycerol (including 1-monothioglycerol, 2-monothioglycerol, and mixtures thereof), and 2-mercaptoethanol; particularly preferred is monothioglycerol.

The chain transfer agents can be used in proportions of from about 0.01 to about 10 phm, depending on their molecular weight and the level of chain transfer activity desired. Usually, they can be used in amounts of from about 0.01 to about 5 phm, and preferably from about 0.01 to about 2 phm. Monothioglycerol is most preferably used in proportions of from about 0.01 to about 1 phm.

One effect of chain transfer agents in polymerization reactions is to lower the average molecular weight and to change the molecular weight distribution of the polymer. When chain transfer agents are used, they participate directly in the polymerization reaction and thus become incorporated into the product polymer as terminal groups. A portion of a chain transfer agent molecule may terminate the growing end of a polymer chain, or it may react with monomer to begin the growth of a new chain. For example, when a chain transfer agent of formula VIII is used, at least a portion of the $R_{14}$ and $R_{15}$ groups become attached as terminal groups on polymer molecules. The sulfur in the mercaptan group or the organic sulfide is more active for chain transfer than the hydroxyl group, so that when $R_{14}$ or $R_{15}$ (other than hydrogen) reacts with polymer or monomer, it bonds through the sulfur, and hydroxyl-terminated polymer molecules are produced. Some of these polymer molecules can have sufficiently low molecular weight that they remain water soluble. Without intending to be bound by any particular theory, it is believed that such water soluble, low molecular weight, hydroxyl-terminated polymers or oligomers can interact with the substantially water insoluble polymer particles in the emulsion or latex to increase the high shear (ICI) viscosity of a paint comprising such an emulsion, thus improving the film build of the paint.

The polymer emulsion is made, for example, by charging the monomeric ingredients, water, and a surfactant (when employed) into a reaction vessel, purging the reaction vessel with an inert gas, e.g., nitrogen, to remove essentially all the oxygen from the reactor vessel, and heating the reactor vessel to the reaction temperature, e.g. from about 80° to about 100° C. When the reactor vessel reaches the desired reaction temperature, an initiator and a chain transfer agent are then added to the reaction vessel, and the reaction is continued for about 2 to about 4 hours. After the reaction is completed, the reactor vessel is cooled. This synthesis yields an aqueous polymeric composition comprising polymer particles suspended or dispersed in water.

Typical initiators include thermally generated free radical sources such as persulfates, perphosphates, and hydrogen peroxide. Generally, the initiator is employed in a concentration of about 0.5 to about 2 phm, and preferably in a concentration of about 0.75 to about 1.25 phm.

Anionic, nonionic, and amphoteric surfactants can be employed in the polymer synthesis process. Exemplary anionic, nonionic, and amphoteric surfactants are Siponate A246L brand surfactant available from Alcolac, polyoxyethylene alkyl phenol surfactants, and N,N-bis-carboxyethyl lauramine, respectively. A preferred nonionic surfactant is an alkylphenoxy poly(oxyethylene)ethanol having a hydrophilic-lipophilic balance of about 13, which is sold as Igepal CO-630 brand surfactant.

Usually, an initial charge comprising water, a buffer (preferably a carbonate or bicarbonate such as ammonium carbonate), at least one surfactant (e.g., anionic and nonionic surfactants), and a minor proportion, from about 1 to about 10 percent, of the monomeric ingredients, that is, the monomer feed, is placed in the reaction vessel, purged, and heated. An initiator system is then added to the reactor. The initiator system can be the above described thermally generated free radical sources or a redox system containing an oxidizing agent (e.g., hydrogen peroxide) and a reducing agent (e.g., sodium metabisulfite or erythorbic acid). An aqueous polymer dispersion is formed. The remainder of the monomeric ingredients, usually pre-emulsified with surfactant in water, and an additional amount of the initiator system are then simultaneous fed into the reactor by separate feed streams. After all the monomer and initiator have been added to the reactor, the reaction is continued for about 15 minutes to about 1 hour and post-addition ingredients are then added to the reactor to reduce any residual monomer concentration. The monomer feed can be a single mixture of all monomeric ingredients or it can be two or more mixtures that can be added separately, either simultaneously or at different times. When all ingredients have been added, the reaction is continued to completion, and the vessel is cooled.

The chain transfer agent can be introduced into the reaction vessel in one portion at the beginning of the polymerization reaction or at some later time during the polymerization. Preferably, the chain transfer agent is delay added to the reaction vessel after a substantial portion, at least about 25 percent, preferably at least about 50 percent, of the time allotted for the polymerization has passed, so that a substantial portion of the monomer feed has been polymerized before the chain transfer agent is introduced into the reaction vessel. Usually, it is preferable to add the chain transfer agent in portions or in a continuous flow during the addition of the monomer feed.

The chain transfer agent can be incorporated into the monomer feed. It can be included in the initial monomer feed mixture, so that it is present in the reaction vessel at or near the beginning of the polymerization and is continually added with the monomeric ingredients until all of the monomer feed has been added. The chain transfer agent is preferably delay added to the remaining monomer feed after a substantial proportion of the initial monomer feed mixture, at least about 25 percent, preferably about 50 percent, has been introduced into the reaction vessel.

The polymer emulsion thus produced can have a low shear viscosity of about 100 to about 16,500 cps measured with a Brookfield viscometer at about 25° C. and about 50 sec$^{-1}$ shear rate. Delayed addition of the chain transfer agent as described above is useful when a polymer emulsion having lower low shear viscosity are desired. Preferably, the polymer emulsion has a low shear viscosity from about 100 to about 1000 centipoise (cps), more preferably from about 200 to about 500 cps, measured at about 25° C. and about 50 sec$^{-1}$ shear rate.

The polymer emulsion of the present invention is most preferably employed in a paint. Usually, paints have a solids content of at least about 40 percent by volume, and more typically about 50 to about 65 percent by volume. Generally, the paint comprises the polymer emulsion, a pigment, and a carrier, e.g., water. In addition, the paint also typically comprises a coalescing aid, a thickening aid, a dispersing aid, a defoamer, and a biocide.

In addition, a paint comprising a polymer emulsion of this invention typically has a high shear viscosity of about 0.5 to about 5.0 poises measured with an ICI cone and plate viscometer according to the manufacturer's instructions (about 25° C. and about 12,000 sec$^{-1}$ shear rate, or cone speed of about 20 rev/min). Preferably, the paint has a high shear viscosity from about 0.5 to about 3.0 poises, more preferably from about 1.0 to about 1.6 poises.

With respect to low shear viscosity, the paint typically has a low shear viscosity of about 65 to about 110 Krebs units measured at about 25° C., and preferably about 80 to about 100 Krebs units measured at about 25° C.

The paint is applied to at least a portion of a surface of a substrate and, when dried, forms a film.

EXAMPLES

In the following examples, Example 1 describes the preparation of polymer latex without the use of any chain transfer agent. Examples 2, 3, and 4 describe the preparation of polymer latexes in accordance with this invention. Example 5 relates to the use of a chain transfer agent, dodecyl mercaptan, that is outside the scope of this invention. Example 1A through 5A describe the preparation of paints comprising the polymer latexes of Examples 1 through 5.

EXAMPLE 1

Preparation of Polymer Latex Without Chain Transfer Agent

A polymer emulsion or latex was prepared by introducing a reactor charge of water (about 241 g) and ammonium carbonate (about 2.6 g) to a reaction vessel. A monomer feed pre-emulsion was prepared, containing water (about 152 g), Siponate A-246L brand alkylaryl sulfonate-type anionic surfactant (about 16 g, 40% active), Igepal CO-630 brand alkylphenoxy poly(oxyethylene)ethanol-type nonionic surfactant (about 16 g), butyl acrylate (about 353 g), methyl methacrylate (about 253 g), and hydroxypropyl methacrylate (about 13 g). The reactor was heated to about 82° C. while purging the reactor with nitrogen. About 26 ml of the monomer feed was added to the reactor. The mixture was stirred for about 5 minutes, and a first initiator solution of sodium persulfate (1.33 g) dissolved in water (26.3 g) was added all at once to the reactor. A second initiator solution containing sodium persulfate (about 1.5 g) dissolved in water (about 41.9 g) was prepared. About 15 minutes after the first initiator was added, addition of the remaining monomer feed and the second initiator solution was begun at flow rates of about 53.2 ml/15 min and 2.4 ml/15 min respectively. Thirty minutes later, addition of a solution of Sipomer WAM brand ureido-containing monomer (about 4.9 g) in water (about 38.3 g) was begun at a flow rate of about 3.1 ml/15 min. Addition of the monomer feed took about 4 hours. When about half the monomer feed had been added to the reaction vessel, methacrylic acid (about 22 g) was mixed with the then remaining monomer feed, which continued to flow into the vessel. Second initiator addition continued about 30 minutes after all the monomer feed had been added. The reaction vessel was then cooled to about 72° C. To remove residual monomer, t-butyl hydroperoxide (about 1.2 g in about 6 ml of water) was added in one portion and about 0.4 g of sodium erythorbate in about 9 ml of water was added over a period of about 1 hour. The reaction mixture was cooled and the pH adjusted to about 8.0 to about 8.3 with ammonia.

EXAMPLE 2
MTG (0.03 phm)

The procedure of Example 1 was followed exactly, except that about 0.19 g (about 0.03 phm) of the chain transfer agent monothioglycerol (MTG) was added to the monomer feed pre-emulsion before any of the monomer feed was charged to the reaction vessel.

EXAMPLE 3
MTG Delay Add (0.03 phm)

The procedure of Example 1 was followed, except that after about half the monomer feed had been added to the reaction vessel, about 0.19 g (about 0.03 phm) of MTG was mixed with the remaining monomer feed, which continued to flow into the reaction vessel.

EXAMPLE 4
MTG (0.1 phm)

The procedure of Example 2 was followed, except that about 0.64 g (about 0.1 phm) of MTG was used.

EXAMPLE 5
Dodecyl Mercaptan Delay Add (0.04 phm)

The procedure of Example 3 was followed, except that about 0.04 phm of dodecyl mercaptan was used instead of the MTG.

EXAMPLES 1A–5A
Preparation of Paints

Five flat white exterior paints (having a PVC content of about 44) were each prepared using the emulsion polymer latexes of Examples 1 through 5 by combining water, Aquathix brand polycarboxylate thickener, Triton N-101 brand surfactant, Polywet ND-2 brand dispersing aid, AMP-95 brand aminomethylpropanol base, ethylene glycol, Colloid 681-F brand defoamer, Nuosept 95 brand and Nopcocide N-96 brand biocides, Tronox CR-800 brand titanium dioxide, 325 mesh mica extender, Duramite brand calcium carbonate extender, and Nytal 300 brand talc extender in the proportions set forth in Table I below.

TABLE I

| Material | Standard Paste Weight, g | Volume, ml |
| --- | --- | --- |
| Water | 2030.9 | 2031.0 |
| Aquathix | 30.5 | 22.8 |
| AMP-95 | 20.3 | 20.3 |
| TritonN-101 | 20.3 | 20.3 |
| Polywet ND-2 | 50.8 | 48.2 |
| Ethylene Glycol | 188.9 | 169.3 |
| Colloid 681-F | 10.2 | 11.8 |
| Nuosept 95 | 20.3 | 22.0 |
| Nopcocide N-96 | 50.8 | 27.1 |

TABLE I-continued

| Material | Standard Paste Weight, g | Volume, ml |
| --- | --- | --- |
| Cr-800 (TiO$_2$) | 2538.6 | 604.2 |
| 325 Mesh Mica | 253.9 | 97.3 |
| Duramite | 1523.2 | 562.8 |
| Nytal 300 | 761.6 | 274.2 |

The material combination listed in Table I was ground at a high speed to a National Standard rating of about 4. Next, Texanol brand coalescing aid, Colloid 681-F brand defoamer, and 55% testing acrylic emulsion polymer latex were added to the ground mixture in the proportions stated in Table II below.

Each paint had the physical properties set forth in Table III.

TABLE II

| Standard Paint Formula | |
| --- | --- |
|  | Weight, g |
| Standard Paste | 60.56 |
| Texanol | 1.64 |
| Colloid 681-F | 0.16 |
| 55% Testing Latex | 31.08 |
| Water | 6.55 |
| Total Weight | 100.00 g |
| Total Volume | 70.00 ml |

TABLE III

| Physical Properties | |
| --- | --- |
| Viscosity, KU | 83–92 |
| Density | 11.9 lbs/gal |
| P.V.C. | 43.7% |
| % Solids | |
| By Weight | 58.1% |
| By Volume | 40.6% |
| pH | 8.4 −/− 0.5 |

The Brookfield (Bfd) viscosity of each polymer latex of Examples 1 through 5 was measured in centipoises on a Brookfield viscometer according to manufacturer's instructions (about 25° C. and about 50 sec$^{-1}$ shear rate). The ICI viscosity of each corresponding paint of Example 1A through 5A was measured in poises at about 25° C. and about 12,000 sec$^{-1}$. The results are presented in Table

TABLE VI

| | Viscosities Examples | | | | |
| --- | --- | --- | --- | --- | --- |
|  | 1 1A | 2 2A | 3 3A | 4 4A | 5 5A |
| Latex, Bfd | 875 | 1650 | 270 | 16800 | 195 |
| Paint, ICI | 1.0 | 1.4 | 1.5 | 2.0 | 1.1 |

Examples 1 and 1A are the reference polymer latex and the standard paint made therewith, respectively. In Example 2, about 0.03 phm of monothioglycerol (MTG) was included in the monomer feed. The ICI viscosity of the corresponding paint 2A was about 40 percent higher than the reference, and the Brookfield viscosity of the latex was still acceptable.

In Example 3, the same amount of MTG was delay added after half the monomer feed had been introduced into the reaction vessel. Note that the ICI viscosity of the paint 3A was about 50 percent higher than the reference while at the same time the Brookfield viscosity of the parent latex 3 was almost 70 percent lower than the viscosity of the reference latex.

In Example 4, a higher amount of MTG (about 0.1 phm) was used, and it was added to the monomer feed at the beginning, so that MTG was present in the reaction vessel from the start of the polymerization reaction. The ICI viscosity of the paint was about 100 percent higher than the reference value, and the Brookfield viscosity of the latex was over 19 times as high as the reference. Latexes of lower viscosity are usually preferred for paint making, but they can be useful where a viscous latex is desired.

Example 5 relates to the use of dodecyl mercaptan, a widely used chain transfer agent different from those useful in the practice of this invention. The amount used (about 0.04 phm) corresponds to about 0.02 phm of MTG based on equivalent numbers of mercaptan groups. If dodecyl mercaptan were comparable to MTG, a paint made with the latex of Example 5 would be expected to have an ICI viscosity of about 1.3. Assuming a measurement error of about $+/-0.05$ poise in measuring ICI viscosity, the figure of 1.1 poise for the ICI viscosity of paint 5A is not significantly different from the reference ICI viscosity of 1.0 poise.

Although the present invention has been described in considerable detail with reference to certain preferred embodiments thereof, other variations are possible. Therefore, the spirit and scope of the appended claims should not necessarily be limited to the description of the preferred embodiments contained herein.

The term "Standard Paint Formula" as used in the specification and the claims means the paint used in Examples 1A-5A; that is, the paint specified in Tables I, II, and III and the associated procedure. The "Testing Latex," adjusted to a nominal 55 percent solids content, is incorporated into the Standard Paint Formula as described and the properties of the paint are measured. When a polymer emulsion made with the use of a chain transfer agent in accordance with this invention is incorporated into the Standard Paint Formula, the resulting paint exhibits a higher high shear (ICI) viscosity, measured at about 25° C. and about 12,000 sec$^{-1}$, than a paint resulting from the incorporation into the Standard Paint Formula in like proportion of a polymer emulsion identically made but without the use of the chain transfer agent.

What is claimed is:

1. A process for producing a polymer emulsion which comprises:
   (a) preparing monomer feed composition emulsified in water, more than about 50 weight percent of the total monomer present being selected from the group consisting of acrylate monomers and mixtures thereof, said composition comprising at least three different acrylate monomers, at least one of which is a hydroxyalkyl acrylate, and in addition thereto, between about 0.1 and about 10 weight percent of an ethylenically unsaturated carboxylic acid monomer;
   (b) polymerizing a proportion of said monomer feed composition in a polymerization zone to form an aqueous polymer dispersion; and
   (c) adding a further proportion of said monomer feed composition to the polymer dispersion and further polymerizing the resulting mixture in the presence of a water-soluble chain transfer agent under conditions effective to produce a product polymer emulsion
   (A) exhibiting lower low shear viscosity, measured at about 25° C. at about 50 sec$^{-1}$ shear rate, than a reference polymer emulsion identically prepared but without the presence of said chain transfer agent; and
   (B) such that the Standard Pain Formula comprising the product polymer emulsion as the Testing Latex exhibits a higher high shear viscosity, measured at about 25° C. at about 12,000 sec$^{-1}$ shear rate, than the Standard Paint Formula comprising the same proportion of the reference polymer emulsion instead of the product polymer emulsion.

2. The process of claim 1 wherein at least about 75 weight percent of the total monomer present is selected from the group consisting of acrylate monomers and mixtures thereof.

3. The process of claim 1 wherein at least about 90 weight percent of the total monomer present is selected from the group consisting of acrylate monomers and mixtures thereof.

4. The process of claim 1 wherein the chain transfer agent is selected from aliphatic mercaptans having from 1 to about 4 carbon atoms; aliphatic halides, preferably chlorides, having 1 to about 3 carbon atoms; aliphatic alcohols having 1 hydroxyl group and from 1 to about 6 carbon atoms; and aliphatic alcohols having 2 or more hydroxyl groups and 2 to about 10 carbon atoms or more.

5. The process of claim 1 wherein the chain transfer agent has both sulfur functionality and oxygen functionality.

6. The process of claim 1 wherein the chain transfer agent has sulfur functionality in the form of a mercaptan group or an organic sulfide linkage.

7. The process of claim 1 wherein the chain transfer agent has oxygen functionality capable of participating in hydrogen-bonding interactions.

8. The process of claim 1 wherein the chain transfer agent has hydroxyl or ether functionality.

9. The process of claim 1 wherein the chain transfer agent has both a chain transfer active sulfur atom and at least one hydroxyl group.

10. The process of claim 1 wherein the chain transfer agent is represented by the formula

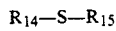

$$R_{14}-S-R_{15}$$

wherein $R_{14}$ and $R_{15}$ are independently selected from (a) straight-chain or branched aliphatic radicals having at least 1 hydroxyl group and from 2 to about 6 carbon atoms, and (b) aliphatic radicals having at least 1 ether oxygen; and wherein $R_{15}$ can be hydrogen.

11. The process of claim 10 wherein $R_{15}$ is hydrogen.

12. The process of claim 1 wherein the chain transfer agent is introduced after a substantial proportion of the monomer feed has been polymerized.

13. The process of claim 12 wherein the chain transfer agent is introduced after about half the monomer feed has been introduced into the polymerization zone.

14. A process for producing a polymer latex which comprises:
   (a) preparing monomer feed composition emulsified in water, more than about 50 weight percent of the total monomer present being selected from the group consisting of acrylate monomers and mixture thereof, said composition comprising at least three different acrylate monomers, at least one of which is a hydroxyalkyl acrylate, and in addition thereto, between about 0.1 and about 10 weight percent of an ethylenically unsaturated carboxylic acid monomer;
(b) polymerizing a proportion of said monomer feed composition in a polymerization zone to form an aqueous polymer dispersion; and
(c) adding a further proportion of said monomer feed composition to the polymer dispersion and further polymerizing the resulting mixture in the presence of a water-soluble chain transfer agent under conditions effective to produce a product polymer emulsion such that the Standard Paint Formula comprising the product polymer emulsion as the Testing Latex exhibits a higher high shear viscosity, measured at about 25° C. and about 12,000 sec$^{-1}$ shear rate, than the Standard Pain Formula comprising in like proportion, instead of the product polymer emulsion, a reference polymer emulsion identically prepared but without the presence of the chain transfer agent.

15. The process of claim 14 wherein at least about 75 weight percent of the total monomer present is selected from the group consisting of acrylate monomers and mixtures thereof.

16. The process of claim 14 wherein at least about 90 weight percent of the total monomer present is selected from the group consisting of acrylate monomers and mixtures thereof.

17. The process of claim 14 wherein the chain transfer agent is selected from aliphatic mercaptans having from 1 to about 4 carbon atoms; aliphatic halides, having 1 to about 3 carbon atoms; aliphatic alcohols having 1 hydroxyl group and from 1 to about 6 carbon atoms; and aliphatic alcohols having 2 or more hydroxyl groups and 2 to about 10 carbon atoms or more.

18. The process of claim 14 wherein the chain transfer agent has both sulfur functionality and oxygen functionality.

19. The process of claim 14 wherein the chain transfer agent has sulfur functionality in the form of a mercaptan group or an organic sulfide linkage.

20. The process of claim 14 wherein the chain transfer agent has oxygen functionality capable of participating in hydrogen-bonding interactions.

21. The process of claim 14 wherein the chain transfer agent has hydroxyl or ether functionality.

22. The process of claim 14 wherein the chain transfer agent has both a chain transfer active sulfur atom and at least one hydroxyl group.

23. The process of claim 14 wherein the chain transfer agent is represented by the formula $$R_{14}-S-R_{15}$$

wherein $R_{14}$ and $R_{15}$ are independently selected from (a) straight-chain or branched aliphatic radicals having at least 1 hydroxyl group and from 2 to about 6 carbon atoms, and (b) aliphatic radicals having at least 1 ether oxygen; and wherein $R_{15}$ can be hydrogen.

24. The process of claim 23 wherein $R_{15}$ is hydrogen.

25. The process of claim 14 wherein the chain transfer agent is introduced after a substantial proportion of the monomer feed has been polymerized.

26. The process of claim 14 wherein the chain transfer agent is introduced after about half the monomer feed has been introduced into the polymerization zone.

27. A process for producing a polymer latex which comprises:
(a) preparing monomer feed composition emulsified in water, at least about 90 weight percent of the total monomer present being selected from the group consisting of acrylate monomers and mixtures thereof, said composition comprising at least three different acrylate monomers, at least one of which is a hydroxyalkyl acrylate, and in addition thereto, between about 0.1 and about 10 weight percent of an ethylenically unsaturated carboxylic acid monomer;
(b) polymerizing a proportion of said monomer feed composition in a polymerization zone to form an aqueous polymer dispersion;
(c) adding a further proportion of said monomer feed composition to the polymer dispersion in the polymerization zone and polymerizing it therein; and
(d) adding a still further proportion of the monomer feed to the polymer dispersion in the polymerization zone and polymerizing it in the presence of a water-soluble chain transfer agent represented by the formula $$R_{14}-S-R_{15}$$

wherein $R_{14}$ and $R_{15}$ are independently selected from (a) straight-chain or branched aliphatic radicals having at least 1 hydroxyl group, preferably 2 or more hydroxyl groups, and from 2 to about 6, preferably 2 to about 4 carbon atoms, and (b) aliphatic radicals having at least 1 ether oxygen; and wherein $R_{15}$ can be hydrogen; under conditions effective to produce a product polymer emulsion such that the Standard Paint Formula comprising the product polymer emulsion as the Testing Latex exhibits a higher high shear viscosity, measured at about 25° C. and about 12,000 sec$^{-1}$, than the Standard Paint Formula comprising in like proportion, instead of the product polymer emulsion, a reference polymer emulsion identically prepared but without the presence of the chain transfer agent.

28. The process of claim 27 wherein the monomer feed comprises at least two different acrylate monomers.

29. The process of claim 27 wherein the acrylate monomer is selected from the group consisting of alkyl esters of acrylic acid and methacrylic acid having 1 to about 8 carbon atoms in the alkyl group.

30. The process of claim 27 wherein the chain transfer agent is represented by the formula $$R_{14}-S-R_{15}$$

wherein $R_{14}$ and $R_{15}$ are independently selected from (a) straight-chain or branched aliphatic radicals having at least 1 hydroxyl group and from 2 to about 6 carbon atoms, and (b) aliphatic radicals having at least 1 ether oxygen; and wherein $R_{15}$ can be hydrogen.

31. The process of claim 30 wherein $R_{15}$ is hydrogen.

32. The process of claim 27 wherein the chain transfer agent is monothioglycerol.

33. The process of claim 27 wherein the monomer feed comprises at least about 1 weight percent of a hydroxyalkyl acrylate monomer.

34. The process of claim 27 wherein the monomer feed comprises at least about 2 weight percent of an ethylenically unsaturated carboxylic acid monomer.

35. The process of claim 1 wherein the chain transfer agent is monothioglycerol.

36. The process of claim 14 wherein the chain transfer agent is monothioglycerol.

37. The process of claim 1 wherein the monomer feed composition comprises butyl acrylate, methyl methacrylate, and hydroxypropyl methacrylate.

38. The process of claim 1 wherein, after a substantial proportion of the monomer feed composition has been introduced into the polymerization zone, at least a portion of the ethylenically unsaturated carboxylic acid is mixed into the remaining monomer feed composition.

39. The process of claim 38 wherein the carboxylic acid monomer is mixed into the remaining monomer feed composition after about half the monomer feed composition has been introduced into the polymerization zone.

40. The process of claim 37 wherein the ethylenically unsaturated carboxylic acid comprises methacrylic acid.

41. The process of claim 40 wherein the chain transfer agent comprises monothioglycerol.

* * * * *